Sept. 6, 1932.   C. A. DE GIERS   1,875,803
CONTENT INDICATING MECHANISM FOR TANKS AND THE LIKE
Filed Nov. 26, 1926   4 Sheets-Sheet 2
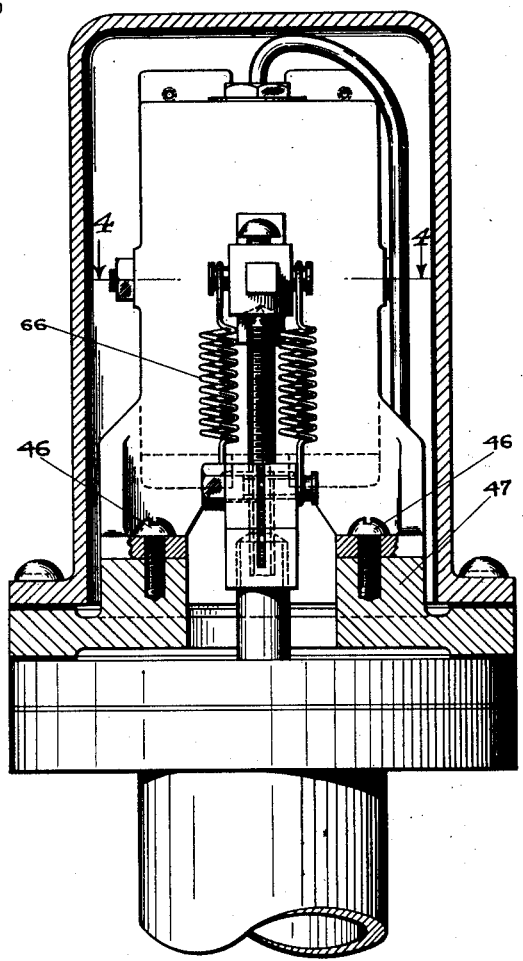
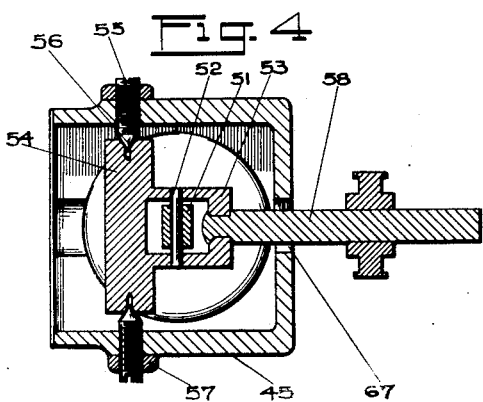
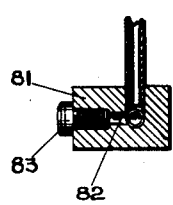
INVENTOR
Clarence A. de Giers
BY
Phelps Lawyer Rice Kennedy
ATTORNEYS Sept. 6, 1932.  C. A. DE GIERS  1,875,803
CONTENT INDICATING MECHANISM FOR TANKS AND THE LIKE
Filed Nov. 26, 1926  4 Sheets-Sheet 3
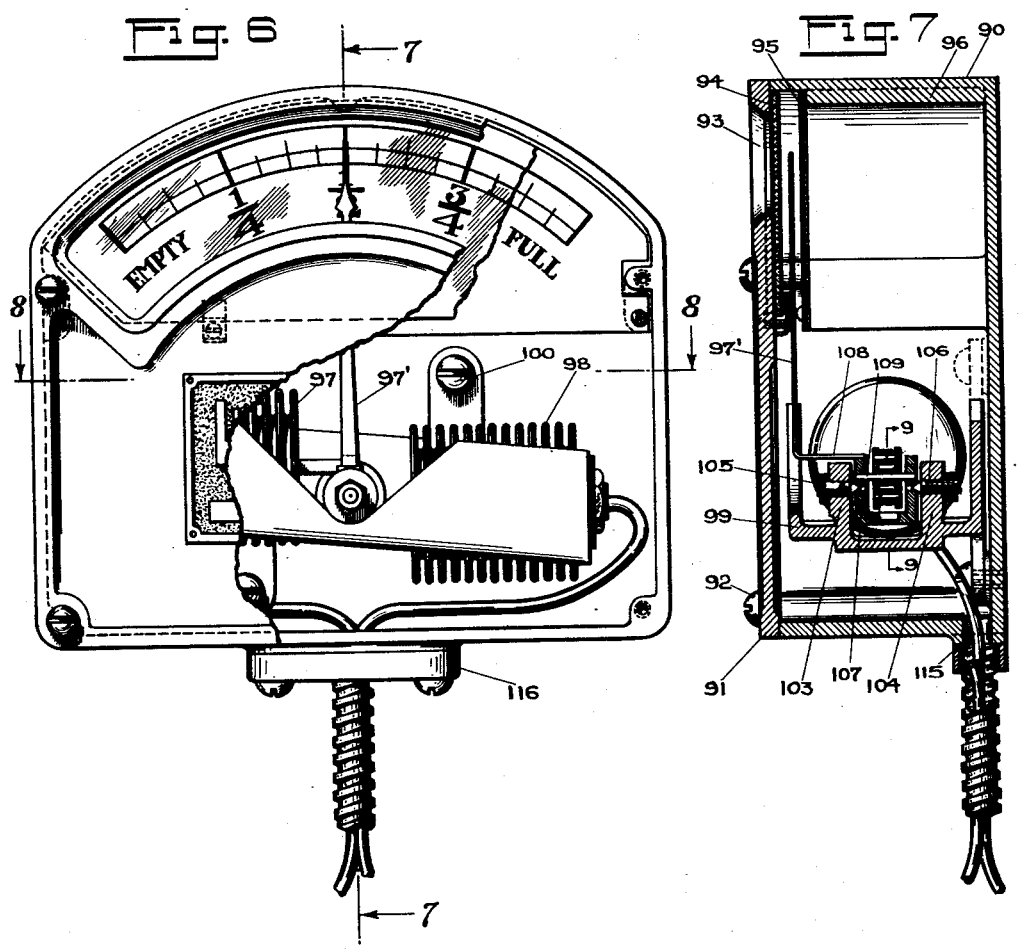
INVENTOR
Clarence A. de Giers
BY
ATTORNEYS Sept. 6, 1932.   C. A. DE GIERS   1,875,803
CONTENT INDICATING MECHANISM FOR TANKS AND THE LIKE
Filed Nov. 26, 1926   4 Sheets-Sheet 4
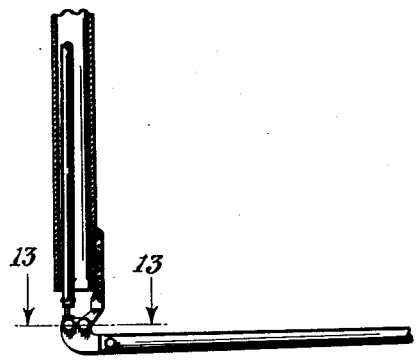
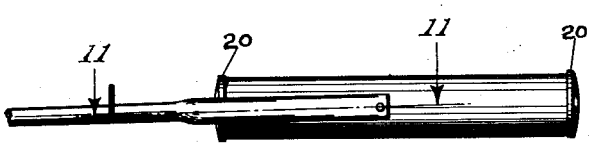
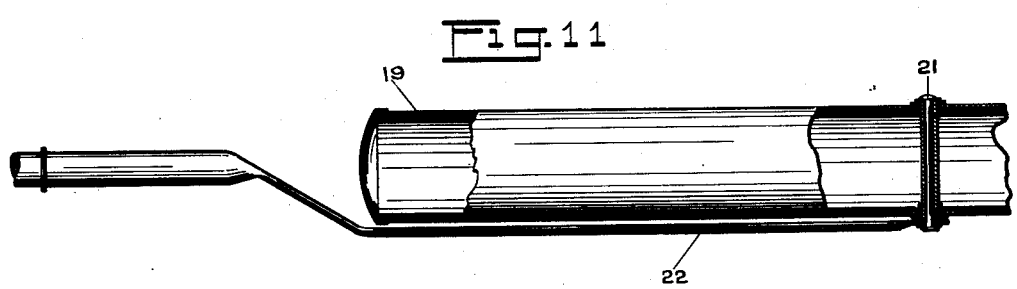
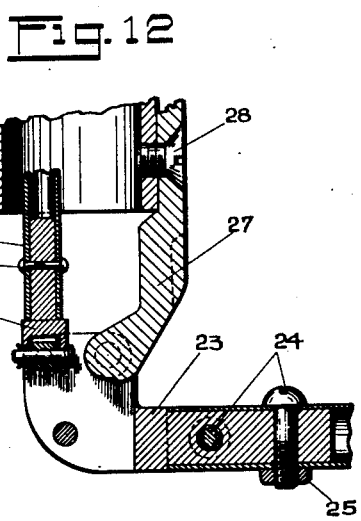
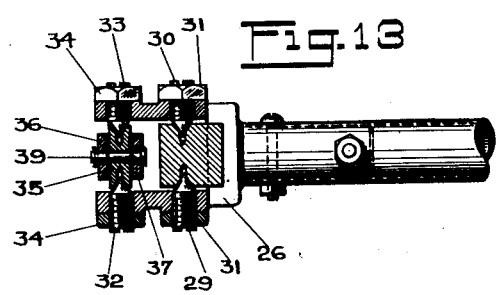
INVENTOR
Clarence A. de Giers
BY
ATTORNEYS Patented Sept. 6, 1932

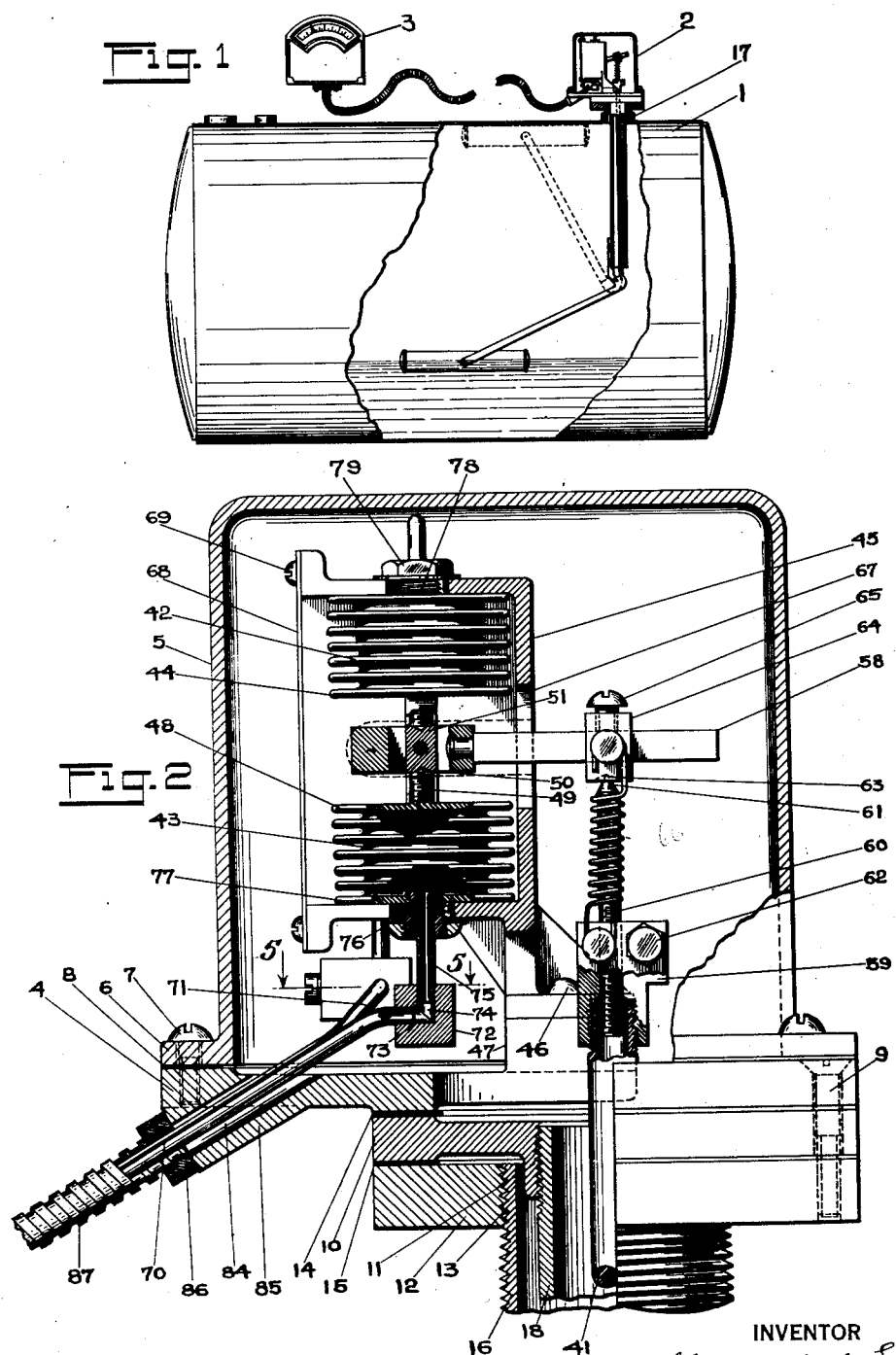

1,875,803

UNITED STATES PATENT OFFICE

CLARENCE A. DE GIERS, OF NEW YORK, N. Y., ASSIGNOR, BY MESNE ASSIGNMENTS, TO THE LIQUIDOMETER CORPORATION, OF WILMINGTON, DELAWARE, A CORPORATION OF DELAWARE

CONTENT INDICATING MECHANISM FOR TANKS AND THE LIKE

Application filed November 26, 1926. Serial No. 150,676.

This invention relates to certain improvements in indicators or gauges for accurately indicating the amount of liquid in a tank or similar liquid holding receptacle.

This indicator, generally speaking, includes a float or a like prime mover, and a pair of compressible and expansible chambers containing a suitable liquid which are compressed and expanded by the action of the float, these chambers being connected by closed liquid holding lines or pipes with an indicating device which is operated by the displacement of the liquid in the chambers due to their expanding and contracting movements. In this instrument means are provided for accurately compensating for temperature changes, so that any movement of the parts or liquid in the line due to such changes does not affect the readings of the indicator. This type of gauge has been found very effective in accurately measuring the liquid contents of a tank or the like where the instrument is used.

It is a special object of the invention to provide a gauge of this type in which the parts are so arranged that the gauge may be used with buried tanks or like receptacles, that is, tanks or receptacles which are buried underground.

A further object of the present invention is to improve the construction of the parts of this gauge so that it will consist of few parts so as to be economical to manufacture, and in which the tank end of the instrument may be accurately adjusted so that it can be used with tanks of varying capacities without having to alter the indicating end of the mechanism.

A further object of the invention is to provide a construction for the tank end of the instrument which shall be dust and moisture proof so that this part of the mechanism can be buried underground, and of such construction that it can be readily installed in the tanks or receptacles with which it is to be used.

With these and other objects not specifically referred to in view, the invention consists in certain novel parts, arrangements and combinations which will be described in connection with the accompanying drawings and the novel features pointed out in the claims hereunto annexed.

In these drawings,—

Figure 1 is a side view, partly broken away and partly in section, of a tank and the improved instrument as used in connection therewith, the view showing the general arrangement and assembly of the parts;

Figure 2 is a vertical section of the tank end of the instrument, certain parts being broken away;

Figure 3 is a side view of the construction shown in Fig. 2 looking from the right;

Figure 4 is a detail sectional view, the section being taken on the line 4—4 of Fig. 3;

Figure 5 is a detail sectional view of part of the construction shown in Fig. 2, the view being taken on line 5—5 of that figure;

Figure 6 is a face view, partly broken away, of the indicator end of the mechanism;

Figure 7 is a central vertical section of the same, the section being taken on line 7—7 of Fig. 6;

Figure 8 is a sectional plan view, partly broken away, the section being taken on line 8—8 of Fig. 6;

Figure 9 is a detail sectional view of part of the mechanism shown in Figs. 7 and 8 on a similar scale, the section being taken on line 9—9 of Fig. 7;

Figure 10 is a detail sectional view on an enlarged scale showing the float and connections of Fig. 1;

Figure 11 is a detail sectional plan view of the float, the section being taken on line 11—11 of Fig. 10 and on a larger scale;

Figure 12 is a sectional view showing the connection of the float arm to the part it operates, and Figure 13 is a sectional view taken on line 13—13 of Fig. 10.

Referring now to these drawings, the mechanism selected to illustrate the invention has been designed particularly for use with a tank or receptacle which is buried underground, but it will be understood that the invention as to certain of its features is not to be limited to such use, but is useful in other relations. In these drawings there is shown a tank 1, circular in cross-section, which is constructed to be buried underground. This tank has located adjacent thereto and outside thereof, so as to be accessible for repair, a part of an indicating mechanism, indicated generally in Fig. 1 by the numeral 2, and located at any suitable point and operated by this mechanism is an indicating mechanism, indicated generally in Fig. 1 by the numeral 3.

In constructions embodying the invention in its best form, the mechanism for the tank end will be so constructed and arranged as to be dust and moisture proof so that it can be buried underground without affecting its operation. This mechanism may be called the tank end of the instrument and will be the first to be described. For simplicity in construction and ease in assembly and so that it will be easily accessible for repair, if necessary, this tank instrument is secured to the tank and outside thereof so that it will be moisture and dirt proof. While the specific construction of this may be somewhat varied, in the particular shown and referring to Figs. 1 to 5, there is provided a base 4 to which is secured a casing 5 having a flange 6 by which the casing may be secured to the base by screws 7, suitable packing 8 being introduced between the parts so as to make them moisture and dirt proof. Secured to this base, as by screws 9, is a ring 10 having an internally threaded flange 11, and below this ring is a collar 12 having an internal thread 13, suitable packing 14, 15 being provided between the base 4, the ring 10 and the collar 12. The threaded collar 12 is adapted to receive the threaded end of a pipe 16, which is screwed into a threaded boss 17 in the wall of the tank, as shown in Fig. 1. The threaded ring 10 has screwed therein the threaded end of a pipe 18, this pipe passing through the threaded pipe 16, before referred to, as shown in Fig. 2.

This pipe 18, preferably, extends down into the tank to a position about midway thereof, as shown in Fig. 1, and forms a support for the float arm and a guide for certain mechanism operated by the float arm, and these mechanisms will now be described. Referring to Figs. 10 to 13, there is shown a float 19 in the form of an elongated metal cylinder, closed at each end by caps or heads 20. This float is pivotally mounted by means of a pin 21 passing through the float to a float arm 22. The outer end of this float arm is hollow and receives a block 23, the float arm being secured to the block by screws 24 and nuts 25. The outer end of this block is formed with a yoke 26, between the arms of which is received the lower end of a bar 27, which is secured to the pipe 18 by screws 28. This block is provided on each side with cone-shaped apertures which receive the coned ends of bearing screws 29, 30, these screws being held in place by nuts 31. These bearings thus form a universal connection for the fulcrum of the float arm, on which the float arm has its pivotal movement. The yoke arms 26 are extended beyond the bearing screws 29, 30 and received a second set of cone-ended screws 32, 33, these screws being held in place by nuts 34. These screws enter coned recesses in a block 35 which is secured between arms 36, 37 of a yoke block 38 by means of a pin 39. This yoke block 38 is secured by a pin 40 to one end of an operating rod 41 which extends up through the pipe 18 and is connected with the operating mechanism through certain improved adjusting connections, and this operating mechanism and these connections will now be described.

The operating mechanism at the tank end of the gauge (Fig. 2) will include a pair of liquid holding chambers 42, 43, the specific construction of which may be somewhat varied. As shown, however, they are made of resilient metal segments formed with flanges 44 and 48 which will compress and expand longitudinally, but which will resist sidewise pressure, the chambers being connected so that as the float moves up and down one of these chambers will expand and the other contact to a like extent. These chambers may be mounted and supported in various ways, but in the best constructions are supported and actuated from the float by an improved adjusting mechanism, by which the movement given them by the float and their consequent expanding and contracting movements may be readily and easily adjusted, so that a standard instrument may be used for tanks of varying capacities.

In the particular construction illustrated for effecting this, the two chambers are supported in a casing 45 secured by screws 46 to a boss 47 formed with the base 4, before referred to, and projecting upwardly inside the casing 5. These chambers are, as shown, preferably vertically arranged and are formed with solid adjacent heads 44 and 48 to which are secured short screws 49 having coned ends which engage coned recesses 50 in a block 51 (Fig. 2) secured by a pin 52 (Fig. 4) in an extension 53 of a fulcrum block 54 mounted on screws 55 having coned ends 56 which engage corresponding coned recesses in the sides of the block, these screws passing through the walls of the casing 45 and being held in position by nuts 57. This construction forms in effect a universal connection which gives a certain amount of desired play between the parts. The extension 53 of the fulcrum block 54 has secured thereto an operating arm 58 which is connected to the float so as to be operated thereby.

In accordance with the invention, the connections between this operating arm and the float are such that the movement given the operating arm may be varied so as to permit the use of the instrument in tanks of different capacities. In the particular construction shown, the rod 41, to which the float is connected, is hollow, as shown in Figs. 2 and 12, and the upper end of this hollow rod is threaded into a block 59 through which is screwed a screw rod 60 having a coned end 61, the lower end of this screw rod passing into the hollow pipe 41, as shown in Fig. 2. By screwing this rod up and down, it will be seen that the distance between the float and the adjusting arm 58 may be lengthened and shortened and thus the zero position of the indicator pointer varied. The screw rod is held in adjusted position, preferably, by pinching it in the block. The block, therefore, as shown, see Fig. 2, is a split block, the parts of which are held together by a pinch bolt 62.

The upper end of the screw rod engages in a coned recess 63 in a block 64 which has a sliding movement on the arm 58, this block being held in position by a set screw 65. By loosening this set screw, the block may be moved within limits along the arm 58 and thus afford an adjustment of the expanding and contracting movements of the chambers 42, 43. In the best constructions, the screw rod 60 and the block 64 are held in operative position by springs 66 secured to the block 64 and the block 59, before referred to.

In the best constructions, a stop will be provided for limiting the upward and downward movements of the float arm 58, so that when assembling the mechanism a careless operator cannot damage the chambers 42, 43 by moving the arm too far, and such a stop is conveniently provided by recessing the wall of the casing 45, as indicated at 67 in Figs. 2 and 4. The casing 45 is provided with a plate 68 secured thereto by screws 69, upon the removal of which the parts may be conveniently assembled in the casing.

In accordance with the invention, the tank instrument thus described actuates an indicating device hereinafter referred to, this being effected by liquid holding connections opening into the chambers and forming with the mechanism for operating the indicator a closed circuit, so that the movement of the liquid in the chambers and in the lines will cause a corresponding movement at the indicator end of the mechanism and effect the desired readings. In the construction illustrated, therefore, there is a liquid transmission line to each of the chambers, these lines being shown in the form of pipes 70, 71, the pipe 70 leading to the lower side of the chamber 43 and the pipe 71 leading to the upper side of the chamber 42 through suitable connections which will now be described. Referring to Figs. 2 and 5, there is provided a block 72 having a channel 73 into which block the end of the pipe 70 is soldered in connected relation with the channel. The block is also provided with a connecting channel 74 into which is soldered the end of a short pipe 75 soldered in a coupling 76 secured in liquid-tight relation with the lower head 77 of the chamber. The other pipe 71 enters the chamber 42 through a threaded coupling 78, and this coupling is provided with a nut 79. The lower coupling 76 is also provided with a nut similar to nut 79, and by tightening these nuts the parts may be securely held in the casing 45.

Means are provided for filling the chambers and the lines and, as shown, there is provided a filling block, see Figs. 1, 2 and 5, marked 81, having a filling channel 82 closed by a screw 83, this block having channels connecting with the pipes so that the pipes and chambers are filled.

The pipes 70, 71 enter the casing 5 through an aperture 84 in a boss 85 formed in the base 4, before referred to, this opening, after the pipes have been assembled, being filled with cement or any other suitable material, the end of the aperture being closed by a packing nut 86. The two pipes, preferably outside the casing, are enclosed in a flexible conduit 87, of any suitable material, such as light metal.

It will be seen with the construction described that the operating mechanism for the tank end of the instrument is entirely enclosed, the parts being so constructed and arranged as to effectually prevent the entrance of dirt when the instrument is used with buried tanks, and also prevents escape of vapors from the tank.

The gauge embodying the invention also includes an indicating device and a mechanism whereby this is operated by the movement of the chambers in the tank end, which has been above described. This indicating mechanism and the means for operating it may be varied somewhat in construction, but in the best constructions this mechanism will be such that the indicator is moved by a lever movement without the necessity of any gearings. In constructions embodying the invention, furthermore, the apparatus as a whole will include means whereby changes in temperature will be compensated for, so that if there is any expansion or contraction in the parts or the fluid in the line such movement will not affect the indicator, so that a true and accurate reading of the tank may be obtained at all times. In machines constructed in accordance with the best practice, these temperature compensating means will be located at the indicator or dial end of the apparatus, because if so located they are not exposed to dirt, moisture and tank vapors, which would be the case if located at the tank end. Such location will also permit of a smaller unit at the tank end, as there is more room for this mechanism at the indicator or dial end. A mechanism for the indicator or dial end is shown in detail in Figs. 6 to 9 and will now be described. As there shown, there is provided a casing 90 having a face plate 91 removably secured thereto by screws 92. This face plate has a viewing opening 93, protected by a suitable glass 94. Behind this glass is a dial 95 having any suitable or desired indicia, this being secured to a web 96 in the upper end of the casing 90. A pointer 97' is arranged to be moved across the face of this dial to effect a reading of the tank contents through mechanism which will now be described.

The operating mechanism for the pointer will, in the best constructions, include a pair of chambers 97, 98, of a similar construction to that of the chambers 42, 43, before referred to, except that, as shown in Fig. 8 the chambers 97, 98 will be composed of about twice as many segments as the chambers 42, 43, for a purpose hereinafter referred to. These chambers are supported in a U-shaped frame 99 secured to the inner wall of the casing 90 by screws 100, and this frame, preferably, will be, as shown in Fig. 6, inclined so as to permit one of the chambers to be arranged offset from the other, the chamber 97, as shown, being supported in a plane above the chamber 98. This construction is adopted so that the connections between the chambers will have a straight line movement, the connecting parts being arranged substantially centrally thereof so as to avoid tipping of the chambers during their movements.

As before stated, the invention includes means for compensating for temperature changes so that the movement of the chambers 97, 98, due to contraction or expansion in the parts or in the line, will not affect the movement of the indicator. In the particular construction shown, the inside adjacent heads of the chambers are provided with short arms 101, 102, and these arms are connected so that as one chamber expands under the working stroke of the float the other chamber will contract, and vice versa, and operate the pointer, and these arms are, furthermore, so connected that the expansion or contraction, due to temperature changes, will not cause any pointer movement. As shown, the frame 99, before referred to, is provided with a pair of spaced projecting brackets 103, 104, see Fig. 7, which form supports for a pair of cone ended screws 105, 106, which engage cone-shaped openings in a yoke block 107, this block, therefore, being capable of having a rocking movement on the screws 105, 106. The pointer 97' is provided with an extension or leg 108, which is secured to one side of the block so as to move therewith, as shown in Fig. 7.

Secured on a pin 109 fastened between the walls of the yoke block is a link 110, this link being capacitated to have a pivotal movement on the pin. This link is, as shown in cross-section, H-shaped, and the arm 101 of the chamber 97 is secured in the upper end of this link on a pin 111, and the arm 102 of chamber 98 is secured on a pin 112 in the lower part of the link. When the chambers 97, 98 are expanded and contracted by the working stroke of the float, the yoke block is rocked on these bearings and moves the pointer, the link, however, moving in a straight line, this being permitted by reason of the yielding or contracting movement of one of the chambers as the other expands. If, however, there is a contraction or expansion of the parts or liquid in the line so that one chamber or the line on one side of the pivot point of the link is unequal to that of the parts on the other side, these parts being full of liquid will not yield and the link will be moved around the pivot pin 109, assuming the position shown in dotted lines in Fig. 9. Such movement, however, does not rock the yoke block, the link moving independently of the block, so that no movement of the pointer occurs.

The pipes 70, 71 are connected to the opposite ends of the chambers, the pipe 70 being connected to the chamber 98, and the pipe 71 to the chamber 97, these connections being through screw couplings 113, 114, similar to the couplings 76, 78, before referred to. The pipes pass into the casing 90 through an aperture 115 formed in the plate 116 bolted to the bottom of the casing.

It will be observed that, as before stated, the chamber 97, 98 have about twice as many segments as the chambers 42, 43. These permit of the expanding and contracting movements due to the motion of the float, and also permit the further contracting and expanding movements due to temperature changes. By employing this construction in the dial end of the instrument, a smaller unit may be employed at the tank end, which is a desirable feature.

With the construction described, it will be seen that a very efficient construction has been provided in which a standard apparatus may be used with tanks of varying capacities, and one in which a very accurate indicating of the contents of the tank is obtained. Furthermore, the units are easily assembled and can be installed with very little trouble. The pivotal connection of the float to the rest of the structure permits the float and the float arm to be swung downwardly in substantially a straight line with respect to the rod to which it is secured, so that it can be readily placed in a tank through a comparatively small opening. The parts are also so arranged as to be readily accessible for inspection or repair, and the tank end of the instrument permits it to be buried in the ground where such use is necessary or required.

While the invention has been shown and described in its preferred forms, it will be understood that many variations in the specific structure and arrangement are permissible without departing from the invention, and that the use of the invention is not to be restricted to buried tanks but may be used in such situations as may be desired.

What I claim is:

1. The combination of a tank, a float in the tank, a float arm, a housing, a base supporting the housing, a collar secured to the base, a threaded coupling threaded to the collar and screwed into the tank, a pipe extending through the coupling and extending into the tank, a rod in the pipe pivotally secured to the float arm, an operating arm, resilient adjustable means connecting the rod and operating arm, and a pair of compressible and expansible chambers pivotally connected to and operated by the operating arm.

2. In an apparatus of the character described, in combination, a tank adapted to contain liquid, a float, an arm pivotally supporting said float in said tank whereby said float may rise and fall with change of level of liquid in said tank, a pair of compressible and expansible chambers located exteriorly of the tank, means interconnecting said chambers whereby one chamber expands when the other contracts, and vice versa, an operating arm pivotally connected to said interconnecting means, adjustable means operatively connecting said operating arm to said float arm, said connecting means including an adjustment exteriorly of the tank whereby the relative angular positions of said arms may be changed, for the purpose set forth.

3. The invention set forth in claim 2 in which said connecting means includes a separable joint and a resilient device for normally maintaining the members of said joint in operable relationship.

4. The invention set forth in claim 2 in which said connecting means includes a device whereby the relative amplitudes of motion of said float arm and said operating arm may be varied.

5. The invention set forth in claim 2 in which said connecting means comprises a rod, adjustable in length, and a readily detachable spring adapted to hold said rod in operative relationship with one of said arms.

In testimony whereof, I have hereunto set my hand.

CLARENCE A. DE GIERS.